US011204298B2

United States Patent
Chintadripet et al.

(10) Patent No.: US 11,204,298 B2
(45) Date of Patent: Dec. 21, 2021

(54) MONITORING A PIPE PLUG

(71) Applicant: Astoria Solutions Pte Ltd., Singapore (SG)

(72) Inventors: Shivakumar N. Chintadripet, Singapore (SG); Dominic Loke, Singapore (SG); Kannan Kamatchi, Singapore (SG)

(73) Assignee: Astoria Solutions Pte Ltd., Singapore (SG)

( * ) Notice: Subject to any disclaimer, the term of this patent is extended or adjusted under 35 U.S.C. 154(b) by 102 days.

(21) Appl. No.: 16/360,966

(22) Filed: Mar. 21, 2019

(65) Prior Publication Data
US 2019/0293517 A1    Sep. 26, 2019

(30) Foreign Application Priority Data
Mar. 23, 2018 (SG) .............................. 10201802422T

(51) Int. Cl.
*G01M 3/14* (2006.01)
*G01M 3/18* (2006.01)
*G01M 3/38* (2006.01)

(52) U.S. Cl.
CPC ............ *G01M 3/143* (2013.01); *G01M 3/183* (2013.01); *G01M 3/38* (2013.01)

(58) Field of Classification Search
CPC ........ G01M 3/14; G01M 3/142; G01M 3/143; G01M 3/146
See application file for complete search history.

(56) References Cited

U.S. PATENT DOCUMENTS 5,228,469 A  *  7/1993  Otten ..................... A01G 25/16
                                                       137/80
6,206,219 B1 *  3/2001  Bruggenolte ...... B60K 15/0409
                                                       220/230
(Continued)

FOREIGN PATENT DOCUMENTS

DE    102013014125 A1    3/2014
JP        7-296277 A2    11/1995
(Continued)

OTHER PUBLICATIONS

International Search Report and Written Opinion for International Application No. PCT/SG2019/050152 dated Jun. 4, 2019.
(Continued)

*Primary Examiner* — Paul M. West
*Assistant Examiner* — Mark A Shabman
(74) *Attorney, Agent, or Firm* — Wolf, Greenfield & Sacks, P.C.

(57) ABSTRACT

A plug monitoring device configured to monitor a plug to be received by an aperture of a pipe is provided. The plug monitoring device may include: a sensor having an output, wherein the sensor is configured to produce at the output a first signal when a plug is tightly installed in the aperture and a second signal at the output when the plug is not tightly installed in the aperture; and circuitry, comprising a transmitter, coupled to the output of the sensor, wherein the circuitry is configured to transmit a signal comprising status information selectively based on a signal at the output of the sensor.

26 Claims, 7 Drawing Sheets

(56) References Cited

U.S. PATENT DOCUMENTS

| | | | |
|---|---|---|---|
| 6,545,576 B1* | 4/2003 | Marchini | H01H 36/0006 335/205 |
| 6,597,290 B2 | 7/2003 | Mogi | |
| 7,322,337 B1* | 1/2008 | Brister | B60K 15/0406 123/198 D |
| 7,397,347 B1* | 7/2008 | Joyce | A45C 11/005 206/5.1 |
| 8,618,933 B2 | 12/2013 | Jensen et al. | |
| 9,041,549 B2 | 5/2015 | McCarty | |
| 9,274,510 B2 | 3/2016 | Burger et al. | |
| 9,557,059 B2 | 1/2017 | Kucera et al. | |
| 9,558,220 B2 | 1/2017 | Nixon et al. | |
| 2003/0102976 A1* | 6/2003 | Lavallee | B60K 15/0406 340/687 |
| 2005/0087235 A1 | 4/2005 | Skorpik et al. | |
| 2008/0156121 A1 | 7/2008 | Radomsky et al. | |
| 2011/0083746 A1 | 4/2011 | Hoang | |
| 2011/0140908 A1 | 6/2011 | Kosht et al. | |
| 2013/0291825 A1 | 11/2013 | Sloan et al. | |
| 2014/0261776 A1* | 9/2014 | Krywitsky | F16L 55/10 137/455 |
| 2017/0066321 A1* | 3/2017 | Szawarski | B60K 15/05 |
| 2017/0089727 A1* | 3/2017 | Lopez | F16B 31/02 |

FOREIGN PATENT DOCUMENTS

| | | |
|---|---|---|
| JP | 10-227400 A2 | 8/1998 |
| JP | 2008-269068 A | 11/2008 |
| JP | 2009-151523 A | 7/2009 |
| JP | 2014-189269 A | 10/2014 |

OTHER PUBLICATIONS

[No Author Listed], Digi-Key. Dig-Key Part No. TLV493DA1B6HTSA2CT-ND. 2 pages. URL:https://www.digikey.sg/product-detail/en/infineon-technologies/TLV493DA1B6HTSA2/TLV493DA1B6HTSA2CT-ND/5891933 [last accessed Jan. 11, 2018].

[No Author Listed], Low Power 3D Magnetic Sensor with I²C Interface. TLV493D-A1B6 3D Magnetic Sensor. Infineon. Jan. 29, 2016. 23 pages.

[No Author Listed], Oil & Natural Gas Remote Monitoring. Big D's SecureValve™. 4 pages. URL: http://www.bigdco.com/automation/oil-natural-gas-remote-monitoring [last accessed Jun. 25, 2019].

[No Author Listed], ValveLink™ Software D102227X012. Emerson. Fisher Controls International LLC. Oct. 2017. 16 pages. URL:http://www.emerson.com/documents/automation/122944.pdf [last accessed Jun. 25, 2019].

PCT/SG2019/050152, Jun. 4, 2019, International Search Report and Written Opinion.

* cited by examiner

MONITORING A PIPE PLUG

CROSS-REFERENCE TO RELATED APPLICATIONS

This application claims priority to Singaporean Patent Application No. 10201802422T, filed on Mar. 23, 2018, the entire contents of which are incorporated herein by reference in their entirety.

BACKGROUND

Industrial process plants, such as chemical plants and refineries, frequently contain miles of pipes and thousands of valves. Plugs are used to close off the aperture at the ends of pipes and may also be used to close off apertures in or near valves. During maintenance, plugs are removed and the liquid within the pipe and/or valve is drained from the pipe. After the maintenance is complete, the plug is reinstalled before continuing operation of the plant. When a plug is not reinstalled properly the plant will not function properly, resulting in time being spent identifying the problem and where in the plant the problem exists.

SUMMARY

According to an aspect of the present application, a plug monitoring device configured to monitor a plug to be received by an aperture of a pipe is provided. The plug monitoring device may include: a sensor having an output, wherein the sensor is configured to produce at the output a first signal when the plug is tightly installed in the aperture and a second signal at the output when the plug is not tightly installed in the aperture; and circuitry, comprising a transmitter, coupled to the output of the sensor, wherein the circuitry is configured to transmit a signal comprising status information selectively based on a signal at the output of the sensor.

In some embodiments, the circuitry further includes a calibration memory and a comparator. The comparator may be configured to receive as inputs the signal at the output of the sensor and a value stored in the calibration memory. The comparator may include an output selectively indicating differences between the signal at the output of the sensor and the value in the calibration memory. The circuitry may be configured to transmit the status information indicating a status of the plug installed in the aperture based on the output of the comparator.

In some embodiments, the circuitry may include a state machine configured to detect a change status of the status of the plug based on the output of the comparator and selectively transmit a signal based on a detected change of state.

In some embodiments, the circuitry may be battery powered.

In some embodiments, the sensor may be a magnetic sensor. The sensor may be, for example, a three-dimensional magnetic sensor or a reed switch sensor.

In some embodiments, the sensor may be an optical sensor.

In some embodiments, the transmitter may be a wireless transmitter.

In some embodiments, the wireless transmitter may be configured to transmit the signal using a Bluetooth (BLE) protocol or a Zigbee protocol.

In some embodiments, the wireless transmitter may be configured to transmit the signal as an encrypted signal.

According to an aspect of the present application a pipe monitoring kit is provided. The pipe monitoring kit may include the plug monitoring device described above, further including a housing and a magnet separate and distinct from the plug monitoring device. The sensor and the circuitry may be disposed within the housing.

In some embodiments, the pipe monitoring kit further includes the plug. The plug may include the magnet.

According to an aspect of the present application a pipe monitoring system is provided. The pipe monitoring system includes a server that includes a memory and a processor coupled to the memory. The processor configured to: receive status information associated with at least one plug monitoring device of a plurality of plug monitoring devices, wherein the status information is based on whether a plug is tightly installed in an aperture of a pipe monitored by the at least one plug monitoring device; store the status information in the memory; and provide an indication of a status of the plug based on the status information.

In some embodiments, the pipe monitoring system further includes a gateway configured to: receive a wireless signal comprising the status information from the at least one plug monitoring device; and transmit the status information to the server.

In some embodiments, the pipe monitoring system further includes the plurality of plug monitoring devices. Each plug monitoring device of the plurality of plug monitoring devices may be configured to monitor a respective plug to be received by an aperture of a respective pipe.

In some embodiments, each of the plurality of plug monitoring devices includes: a sensor having an output, wherein the sensor is configured to produce at the output a first signal when the respective plug is tightly installed in the aperture and a second signal at the output when the plug is not tightly installed in the aperture; and circuitry, comprising a wireless transmitter, coupled to the output of the sensor, wherein the circuitry is configured to transmit a wireless signal comprising the status information selectively based on a signal at the output of the sensor.

According to an aspect of the present application a method of monitoring a plug to be received by an aperture of a pipe is provided. The method includes generating, using the at least one sensor, a first signal when the plug is tightly installed in the aperture and a second signal when the plug is not tightly installed in the aperture; and transmitting, using circuitry comprising a transmitter, a signal comprising the status information selectively based on the first signal and/or the second signal.

In some embodiments, the method further includes comparing the first signal to a calibration value to generate a comparison result; and generating the status information based on the comparison result.

According to an aspect of the present application, a gate monitoring device configured to monitor a nonstationary portion of a gate to be received by a stationary portion of the gate is provided. The plug monitoring device may include: a sensor having an output, wherein the sensor is configured to produce at the output a first signal when the nonstationary portion of the gate is closed relative to the stationary portion and a second signal at the output when the nonstationary portion of the gate is not closed relative to the stationary portion of the gate; and circuitry, comprising a transmitter, coupled to the output of the sensor, wherein the circuitry is configured to transmit a signal comprising status information selectively based on a signal at the output of the sensor.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
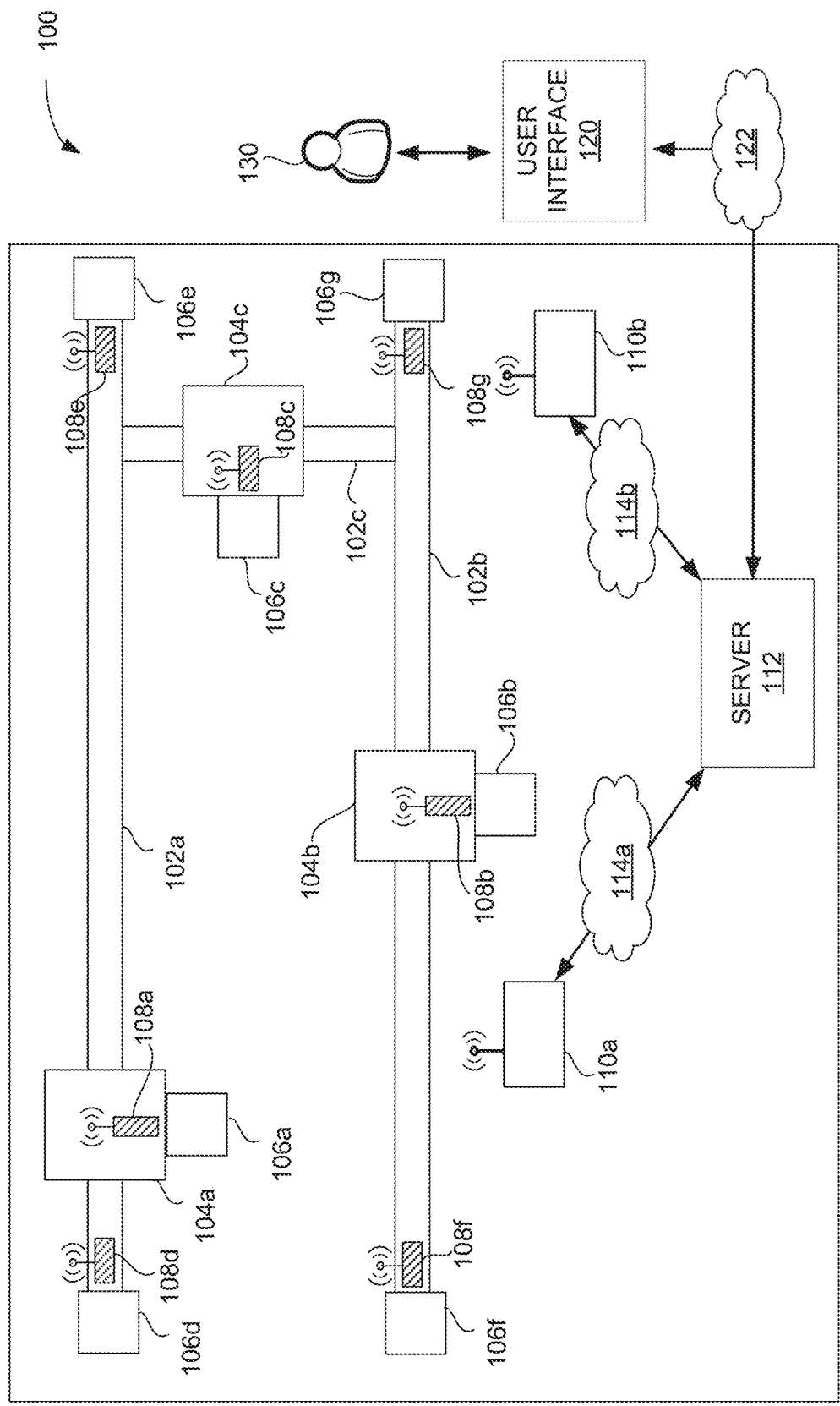
FIG. 1 is a schematic illustration of an example environment where plugs are monitored.

The inventors have recognized and appreciated techniques for improving operation of industrial plants. Those techniques include monitoring the status of multiple plugs used in the pipes of an industrial plant. The techniques may be implemented using plug monitoring devices that detect when a plug is not tightly installed in the aperture of a pipe and transmit status information regarding the status of the plug to a server that notifies a user of the status of the plugs in the plant. By being able to remotely monitor multiple plugs (e.g., hundreds or thousands of plugs) simultaneously, the time and effort needed to identify that a plug is improperly installed and locate the problematic plug is significantly reduced as compared to a plant that does not actively monitor the plugs. In addition to sending status information to a server, the plug monitoring device may indicate the status of the plug locally using an indicator such as a visual indicator (e.g., one or more lights) or an audible indicator (e.g., a speaker that produces a sound). These local indications of plug status may notify a user performing maintenance that the plug is not tightly installed. In this way, it is less likely that the user will forget to reinstall the plug in the aperture or leave the plug loosely installed in the aperture.

In some embodiments, a plug monitoring device works collaboratively with a separate, external component to monitor the status of a plug. For example, the plug monitoring device may include a magnetic sensor capable of detecting the distance between the magnetic sensor and a magnet. When the magnetic sensor is installed near an aperture of a pipe or a valve and the magnet is installed on the plug associated with the aperture, the magnetic sensor is able to determine whether the plug is tightly installed within the aperture based on the measured distance.

In some embodiments, the plug monitoring device may be retrofitted to existing piping components, such as pipes and valves. Alternatively, a plug monitoring device can be included on new piping components. In either example, the plug monitoring device and associated components, such as the magnet, may have different form factors to fit existing pipes and plugs. For example, pipes and plugs come in a variety of diameters. In some embodiments, a magnet may be fitted around a threaded part of a plug. Thus, a variety of magnet sizes and shapes may be used to accommodate the different pipe and plug sizes used in various industrial applications.

The inventors have further recognized and appreciated, that installing and maintaining the plug monitoring devices may be simplified by making the devices wireless and powered by batteries. Using wireless, battery-powered devices removes the need for external data cables and power cables leading to the devices. Removing the limitations of cables allows the plug monitoring devices to be installed anywhere in the plant without being concerned with how wires can efficiently be fed to each plug monitoring device.

In some embodiments, a plug monitoring device is configured to operate in a low-power mode to enable battery powered operation. For example, the device may enter a low power mode when the status of the plug has not changed within a threshold amount of time. For example, if the device determines, while in a higher power mode, that the plug has remained tightly installed for 5 minutes, then the device enters the low power mode. In the low power mode, a number of things may be done to reduce power consumption, including, but not limited to, reducing the frequency at which the status of the plug is measured, reducing the frequency at which the status of the plug is transmitted, reducing the frequency at which the status of the plug is locally indicated (e.g., using a light).

In some embodiments, a plug monitoring device may use a low-power wireless communication protocol to send status information to a server. For example, Bluetooth™, Bluetooth™ Low Energy, Zigbee, or other wireless communication protocols that use less power than longer range wireless protocols may be used by plug monitoring device. In some embodiments, the status information is received by an intermediate gateway device before being sent to the server. Multiple gateway devices may be placed throughout the plant to receive status information from the multiple plug monitoring devices. Gateway devices may be placed in locations such that there is at least one gateway device within range of every plug monitoring device in the plant. In some embodiments, the gateway devices are not wireless devices and receive power through a power cord and transmit information to the server via a wired connection. Because there may be fewer gateway devices than plug monitoring devices and the precise location of the gateway devices is less important than the location of the plug monitoring devices, having wired connections to the gateway devices is less of a concern than having wired connections to each of the plug monitoring devices.

The inventors have further recognized and appreciated, that the plug monitoring devices may be installed on various components by a user in slightly different ways and, therefore, allowing calibration of the plug monitoring device will enhance the performance and ease of use of the device. For example, when the plug monitoring device is installed near an aperture, the distance between the sensor of the plug monitoring device and the magnet on the plug may be different for each device installed in the plant. Providing a user with a calibration technique to store a first position of the plug as corresponding to a position that is tightly installed in the aperture and a second position of the plug as corresponding to a position that is not tightly installed in the aperture allows the plug monitoring device to be quickly installed without precisely positioning the plug monitoring device at a particular location relative to the aperture. Providing the user with a calibration technique also allows the plug monitoring device to be reused on a different piping component. For example, the user may install the plug monitoring device to monitor a first plug in the plant and then, at a later time, remove the plug monitoring device from its location near the first plug and install the plug monitoring device near a second plug. This type of reinstallation is simplified by the ability to simply re-calibrate the plug monitoring device after being installed near the second plug.

An example environment 100 in which plugs may be monitored by plug monitoring devices is illustrated in FIG. 1. The environment 100 includes a plant 101 and a user 130 that uses a user interface 120 to receive information about the status of multiple plugs within the plant 101. The plant 101 includes multiple pipes 102a-c (referred to collectively by the reference number 102), multiple valves 104a-c (referred to collectively by the reference number 104), multiple plugs 106a-g (referred to collectively by the reference number 106), multiple plug monitoring devices 108a-g (referred to collectively by the reference number 108), multiple gateway devices 110a-b (referred to collectively by the reference number 110), communication networks 114a-b (referred to collectively by the reference number 114), and a server 112.

The pipes 102 are interconnected and may carry fluid, such as a liquid or a gas, to various processing areas (not shown). While FIG. 1 shows three pipes 102 connected in a particular configuration, embodiments are not so limited. In some embodiments, there are more than three pipes that may be connected in any suitable way to achieve the process for which the plant is designed. In some embodiments, not all the pipes are interconnected with one another. The pipes 102 may be any suitable size and shape. While the pipes 102 are illustrated as being the same size, embodiments are not so limited. In some embodiments, the pipe 102a may have a different diameter than the pipe 102c and/or pipe 102b.

One or more of the pipes 102 may include an aperture that receives a plug so that the aperture may be closed during some phases of operation of the plant but may be opened during maintenance or other phases of operation. In the illustrated embodiment, apertures in valves 104 serve as one example of an aperture in a pipe. Plugs in the valves may be removed, for example, to enable cleaning or maintenance on the valves.

The valves 104 are located at various throughout the plant 101. The valves 104 may be selected from a variety of valve types. By way of example and not limitation, the valves 104 may be ball valves, butterfly valves, clapper valves, choke valves, diaphragm valves, gate valves, globe valves, needle valves, pinch valves, piston valves, plug valves, or poppet valves. The valves 104 each have an associated plug 106 that may be removed from the valve. For example, the valve 104a is associated with the plug 106a. The plug 106a is shown in FIG. 1 as part of the valve 104a. In other embodiments, the plug associated with the valve may be separate from the valve, in proximity to the valve and located in the same pipe as the valve.

While the plugs 106a-c are associated with the valves 104a-c, there are additional the plugs 106d-g that are not associated with a particular valve, but are located at the end of a pipe. For example, the plugs 106d-e are located at the ends of the pipe 102a, and the plugs 106f-g are located at the ends of the pipe 102b. Each of the plugs 106 fits into an aperture either in one of the valves 104 or one of the pipes 102. In some embodiments, the plugs 106 are threaded and the aperture is also threaded, such that the plug may be screwed into the aperture. When, for example, the plug 106d is tightly installed in the aperture of the pipe 102a, the fluid within the pipe cannot escape through the aperture. However, if the plug 106d is not installed in the aperture of the pipe 102a, or is not tightly installed in the aperture, than fluid may escape.

Each of the plugs 106 has an associated plug monitoring device 108 that can determine whether the corresponding plug is tightly installed in the aperture. For example the plug monitoring device 108d monitors the plug 106d. The plug monitoring device 108d is attached to the pipe 102a in proximity to the aperture in which the plug 106d is installed. Similarly, the plug monitoring device 108a monitors the plug 106a. The plug monitoring device 108a is attached to the valve 108a in proximity to the aperture in which the plug 106a is installed. The plug monitoring devices 108 are attached to the pipes 102 or the valves 104 in any suitable way. In some embodiments, the plug monitoring devices 108 are adhesively connected to the pipes 102 or the valves 104. In some embodiments, the plug monitoring devices 108 are tied or strapped to the pipes 102 or the valves 104.

Each of plug monitoring devices 108 includes a sensor that generates an output signal based on the proximity of an associated plug to the sensor. For example, the plug monitoring device 108d includes a sensor that generates an output signal that is a first signal when the plug 106d is tightly installed in the aperture of pipe 102a and a second signal that is different from the first signal when the plug 106d is not tightly installed in the aperture of pipe 102a. In some embodiments, the plug monitoring device 108d generates status information based on the output signal of the sensor. In some embodiments, the status information may include a detected magnetic strength value, which is a function of the distance between the sensor and the a magnetic attached to the plug 106d. Whether the plug is tightly installed can then be determined by a device separate from the plug monitoring device 108. The plug monitoring device 108d transmits the status information to the server 112 via the gateway device 110a or the gateway device 110b. In some embodiments, the plug monitoring device 108d transmits the status information wirelessly. For example, the plug monitoring device 108d may transmit the status information using Bluetooth™, Bluetooth™ Low Energy, Zigbee, or other wireless communication protocols.

In some embodiments, plug monitoring devices 108 transmit the status information periodically. The plug monitoring devices 108 may operate in a low power mode or a higher power mode. In some embodiments, the plug monitoring devices 108 transmit the status information at a lower frequency when operating in the low power mode versus the higher power mode. For example, in a low power mode the plug monitoring devices 108 may transmit the status information every five seconds, whereas in a high power mode the monitoring devices 108 may transmit the status information every second. Embodiments are not limited to any particular frequencies for transmitting the status information.

In some embodiments, the plug monitoring devices 108 send additional information with the status information. For example, timing information and identifier information may be sent. In some embodiments, the timing information may include an indication of the time that the status information is transmitted by the plug monitoring device and the identifier information may include an indication of which of the plug monitoring device of the plug monitoring devices 108 sent the status information.

The gateway devices 110 receive the status information from the plug monitoring devices 108. While FIG. 1 only shows two gateway devices 110, some embodiments may include more than two gateway devices. Each of the gateway devices 110 may receive the status information from a subset of the gateway devices 110. For example, gateway device 110a may receive the status information from the plug monitoring devices 108*a*, 108*b*, 108*d*, and 108*f* and gateway device 110*b* may receive the status information from the plug monitoring devices 108*c*, 108*e*, and 108*g*. In some embodiments, status information from a particular plug monitoring device may be received by more than one of the gateway devices 110. For example, the plug monitoring device 108*b* is located between the gateway device 110*a* and the gateway device 110*b*. Both gateway devices 110 may be within the wireless transmission range of the plug monitoring device 108*b* and, therefore, both gateway devices 110 may receive the status information transmitted by the plug monitoring device 108*b*.

After receiving status information from one or more of the plug monitor devices 108, the gateway devices 110 transmit the status information to a server. In some embodiments, the gateway devices 110 may not be directly connected to the server 112. For example, gateway device 110*a* transmits the status information to the server 112 via a communication network 114*a* and gateway device 110*b* transmits the status information to the server 122 via a communication network 114*b*. In some embodiments, the communication networks 114 are the same network. In some embodiments, the communication networks 114 may include may include switches, routers and bridges that aid in transferring the status information from the gateway devices 110 to the server 112.

The server 112 receives the status information from the plug monitor devices 108 via the gateway devices 110 and the communication networks 114. The server 112 stores the status information in memory and may provide the status information to the user 130, who monitors the plant 101 via a user interface 120. The status information is transmitted via a communication network 122. In FIG. 1, the communication network 122 is shown outside of the plant 101. However, in some embodiments, the communication network 122 includes communication networks 114. In some embodiments, the communication network 122, the user interface 120 and the user 130 may be located within the plant 101. In some embodiments, the user interface 120 includes a computing device with a display capable of displaying status information to the user. In some embodiments, the server 112 may be in the cloud, which allows multiple gateways to send data to the server 112, allowing the server to organize and process the data, and a user to access the data without needing to know how the server 112 is connected to the plant 101.

In some embodiments the user interface 120 may be a mobile device that is capable of displaying the status of plugs that are within a particular distance of the mobile device, i.e., within the vicinity of the mobile device. In some embodiments, the status information for the plugs within the vicinity of the mobile device are retrieved wirelessly from the server 112. Additionally or alternatively, the plug monitoring devices 108 may wirelessly transmit status information directly to the mobile device such that the mobile device acts as a portable gateway 114. In some embodiments, the display of the user interface 120 displays a visual representation of the plant or a portion of the plant and displays an indication of the status of at least a portion of the plugs in the displayed portion of the plant. For example, a green circle may be displayed over the visual representation of the plant at the location of a plug that is tightly closed and a red circle may be displayed over the visual representation of the plant at the location of a plug that is not tightly closed.

As mentioned above, in some embodiments, both the gateway device 110*a* and the gateway device 110*b* may receive the status information transmitted by the plug monitoring device 108*b*. In some embodiments, both copies of the status information may be transmitted to the server 112. When the duplicate status information is received by the server 112, the server may identify the duplicate information and store only one copy of the status information. This may be done using timing information and identifier information sent along with the status information by the plug monitoring device 108 to determine that two instances of status information correspond to the same plug monitoring device 108*b* transmitted at the same time.

Figure 2A:
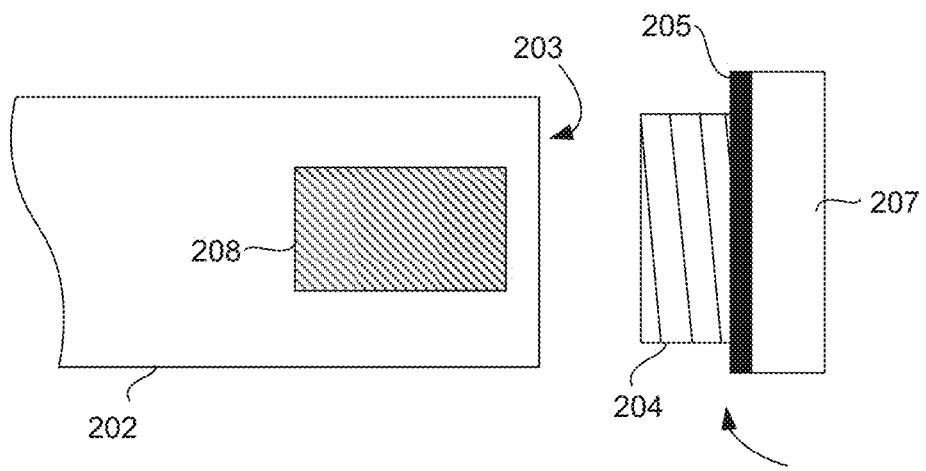
FIG. 2A is a schematic illustration of an example pipe and plug monitoring device.

An example of a plug monitoring device 208 attached to a pipe 202 is shown in FIG. 2A. The plug monitoring device 208 monitors a plug 206 which is configured to fit into an aperture 203 of the pipe 202. The pipe 202 may be, for example, any one of the pipes 102 of FIG. 1; the plug 206 may be, for example, any one of the plugs 106*d-g* of FIG. 1; and the plug monitoring device 208 may be, for example, any one of the plug monitoring devices 108*d-g* of FIG. 1.

The plug 206 is configured to securely engage with an aperture. In the illustrated embodiment, plug 206 includes a threaded part 204 that mates with a threaded portion of the pipe 202 inside the aperture 203. For example, the aperture 203 of the pipe 202 may have a diameter that matches the diameter of a threaded portion 204 of the plug 206. The plug 206 includes a head portion 207 that is wider than the threaded portion 204. In some embodiments, the head portion 207 may include flats such that a wrench may be used to tighten and loosen the plug.

The plug monitoring device 208 is attached to the pipe 202 near the aperture 203. For example, the distance from the plug monitoring device 208 to the aperture 203 may be between 1 mm and 3 cm. In some embodiments, the plug monitoring device 208 may be attached to the pipe 202 using an adhesive, such as a tape, glue, or an epoxy. In some embodiments, the plug monitoring device 208 may be tied or strapped to the pipe 202 using, by way of example and not limitation, string, zip ties, or straps. In some embodiments, the plug monitoring device 208 is installed on a pipe 202 that is already in use within a plant. In other embodiments, a portion of pipe 202 may come with the plug monitoring device 208 pre-installed prior to installing the pipe 202 in the plant.

As is discussed in more detail below, the plug monitoring device 208 includes a sensor to monitor the status of the plug 206. In some embodiments, the sensor provides an output that changes based on the distance between the sensor and the plug 206. For example, the sensor may produce, at an output, a first signal when the plug is tightly installed in the aperture and a second signal when the plug is not tightly installed in the aperture. In some embodiments, the sensor outputs an analog or digital signal that can be used to determine if the plug is tightly installed. For example, the sensor may produce a signal that is a function of the distance between the sensor and the plug. In some embodiments, the sensor is a magnetic sensor that measures the magnetic strength at the sensor location, which is associated with the distance to a magnet that is external to the sensor. In some embodiments, a magnet 205 is attached to the plug 206 in a position that can be sensed by the monitor. For example, an annular magnet may be placed around the threaded portion 204 and placed in physical contact with the aperture-facing face of the head portion 207. In another example, a magnet may be placed around the outer diameter of the head portion 207. In some embodiments, the magnet 205 is installed on a plug 206 that is already in use within a plant. In other embodiments, the plug 206 may come with the magnet 205 pre-installed prior to installing the pipe 202 in the plant.

In some embodiments, where the plug monitoring device 208 is preinstalled on the pipe 202 and the magnet 205 is pre-installed on the plug 206, the plug monitoring device 208 may be pre-calibrated such that a person installing the plug monitoring device 208 does not have to perform the calibration process described below. In some embodiments, the pipe 202 with the pre-installed plug monitoring device 208 and the plug 206 with the pre-installed magnet 205 may be packaged as a pipe plug monitoring kit. In other embodiments, the plug monitoring device 208 the magnet 205 may be packaged as a pipe plug monitoring kit for use in retrofitting an existing pipe 202 and plug 206. In some embodiments, the pipe plug monitoring kit may include an attachment mechanism to attach the plug monitoring device 208 to the existing pipe 202. In some embodiments, the pipe attachment mechanism may be a strap, a band, of flanges that can be screwed, welded, tied or otherwise attached to the pipe 202.

Figure 2B:
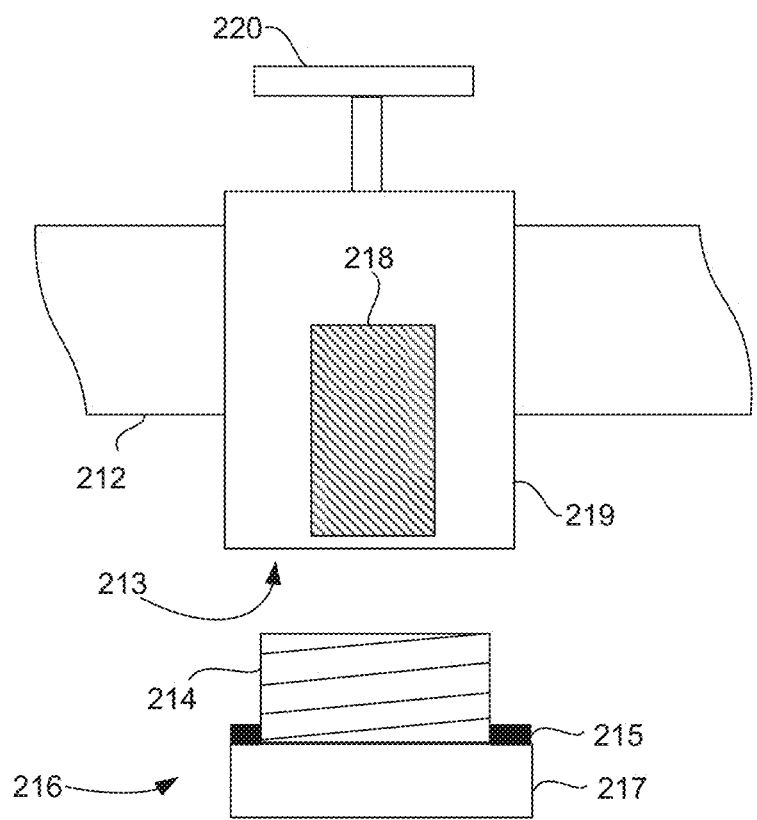
FIG. 2B is a schematic illustration of an example valve and plug monitoring device.

An example of a plug monitoring device 218 attached to a valve 219 is shown in FIG. 2B. The plug monitoring device 218 monitors a plug 206 which is configured to fit into an aperture 213 of the valve 219. The valve 219 controls the flow of a fluid in a pipe 212. The pipe 212 may be, for example, any one of the pipes 102 of FIG. 1; the valve 219 may be, for example, any one of the valves 104a-c of FIG. 1; the plug 216 may be, for example, any one of the plugs 106a-c of FIG. 1; and the plug monitoring device 208 may be, for example, any one of the plug monitoring devices 108a-c of FIG. 1.

The plug 216 is configured to securely engage with an aperture. In the illustrated embodiment, plug 216 includes a threaded part 214 that mates with a threaded portion of the valve 219 inside the aperture 213. For example, the aperture 213 of the valve 219 may have a diameter that matches the diameter of a threaded portion 214 of the plug 216. The plug 216 includes a head portion 217 that is wider than the threaded portion 214. In some embodiments, the head portion 217 may include flats such that a wrench may be used to tighten and loosen the plug.

The plug monitoring device 218 is attached to the valve 219 near the aperture 213. For example, the distance from the plug monitoring device 218 to the aperture 213 may be between 1 mm and 3 cm. In some embodiments, the plug monitoring device 218 may be attached to the valve 219 using an adhesive, such as a tape, glue, or an epoxy. In some embodiments, the plug monitoring device 218 may be tied or strapped to the valve 219 using, by way of example and not limitation, string, zip ties, or straps. In some embodiments, the plug monitoring device 218 is installed on a valve 219 that is already in use within a plant. In other embodiments, the valve 219 may come with the plug monitoring device 218 pre-installed prior to installing the valve 219 in the plant.

As is discussed in more detail below, the plug monitoring device 218 includes a sensor to monitor the status of the plug 216. In some embodiments, the sensor provides an output that changes based on the distance between the sensor and the plug 216. For example, the sensor may produce, at an output, a first signal when the plug is tightly installed in the aperture and a second signal when the plug is not tightly installed in the aperture. In some embodiments, the sensor outputs an analog or digital signal that can be used to determine if the plug is tightly installed. For example, the sensor may produce a signal that is a function of the distance between the sensor and the plug. In some embodiments, the sensor is a magnetic sensor that measures the magnetic strength at the location of the sensor, which is associated with the distance to a magnet that is external to the sensor. In some embodiments, a magnet 215 is attached to the plug 216 in a position that can be sensed by the monitor. For example, an annular magnet may be placed around the threaded portion 214 and placed in physical contact with the aperture-facing face of the head portion 217. In another example, a magnet may be placed around the outer diameter of the head portion 217. In some embodiments, the magnet 215 is installed on a plug 216 that is already in use within a plant. In other embodiments, the plug 216 may come with the magnet 215 pre-installed prior to installing the valve 219 in the plant.

In some embodiments, where the plug monitoring device 218 is preinstalled on the valve 219 and the magnet 215 is pre-installed on the plug 216, the plug monitoring device 218 may be pre-calibrated such that a person installing the plug monitoring device 208 does not have to perform the calibration process described below. In some embodiments, the valve 219 with the pre-installed plug monitoring device 218 and the plug 216 with the pre-installed magnet 215 may be packaged as a valve plug monitoring kit. In other embodiments, the plug monitoring device 218 the magnet 215 may be packaged as a valve plug monitoring kit for use in retrofitting an existing valve 219 and plug 216. In some embodiments, the valve plug monitoring kit may include an attachment mechanism to attach the plug monitoring device 218 to the existing valve 219. In some embodiments, the pipe attachment mechanism may be a strap, a band, of flanges that can be screwed, welded, tied or otherwise attached to the valve 219.

Figure 3:
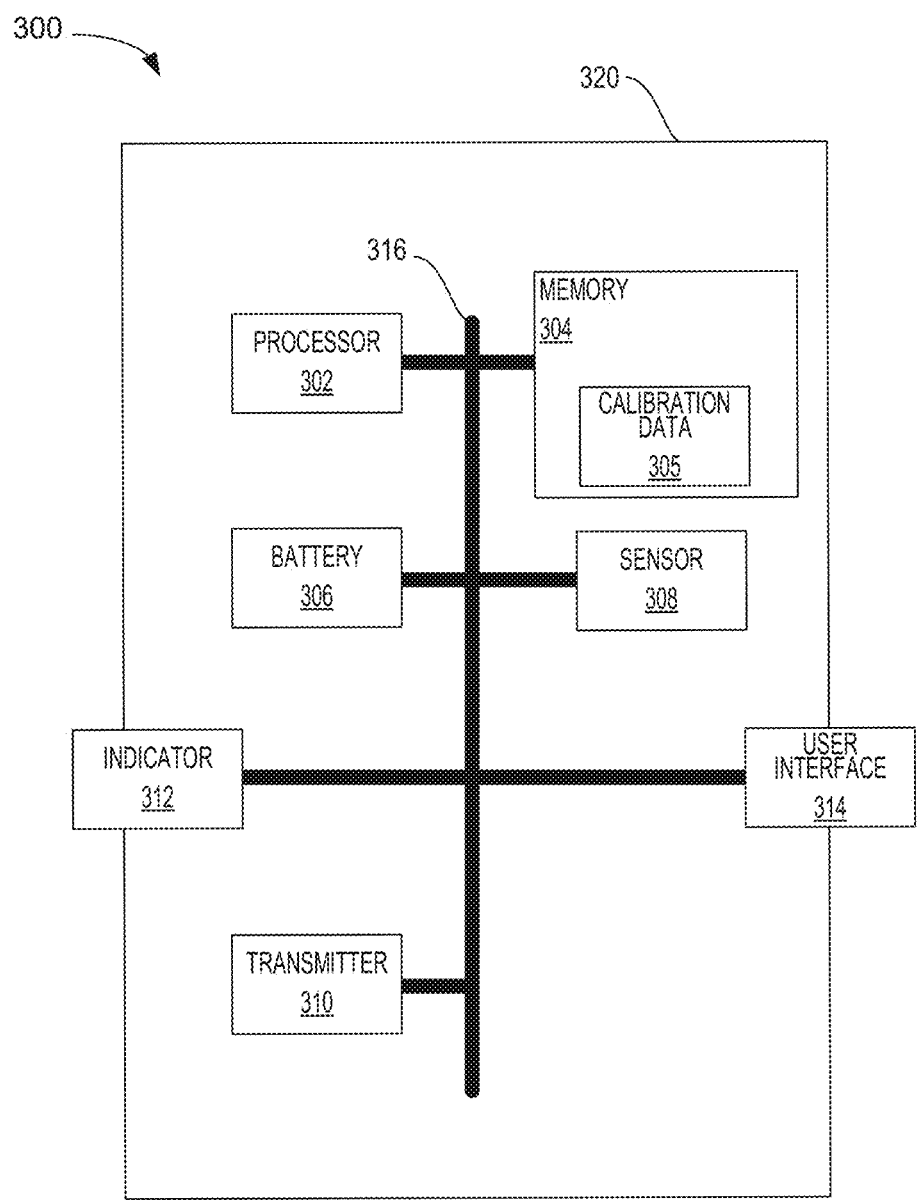
FIG. 3 is a schematic diagram of an example of a plug monitoring device.

A schematic diagram of an example plug monitoring device 300 is shown in FIG. 3. The plug monitoring device 300 includes a processor 302, a memory 304, a battery 306, a sensor 308, a transmitter 310, an indicator 312, a user interface 314, a bus 316 and a housing 320. The various components communicate with one another using the bus 316 and/or other wiring (not shown). The indicator 312 and the user interface 314 may be partially within the housing 320 and partially outside the housing 320. The other components are illustrated within the housing 320, but embodiments are not so limited. In some embodiments, portions of other components may be partially outside the housing 320. For example, the transmitter 310 may include an antenna (not shown) that is outside the housing 320 and/or the sensor 308 may include be partially outside the housing 320.

The memory 304 is configured to store information and, in some embodiments, stores computer executable instructions that, when executed by the processor 302, perform actions described herein. The memory 304 may be non-transitory storage device, such as RAM, ROM, EEPROM, flash memory or other memory technology. In some embodiments the memory 304 stores calibration data 305 acquired during a calibration process that is described below. The calibration data may be, for example, an indication of a first value of the output signal from sensor 308 that is associated with a tightly installed plug and second value of the output signal that is associated with plug that is not tightly installed. In some embodiments, a single calibration value may be stored, the single calibration corresponding to the threshold between a tightly installed plug and a plug that is not tightly installed.

The sensor 308 is a sensor capable of measuring the status of a plug. The sensor 308 includes an output where a signal is produced based on the location of the plug relative to the sensor 308. The output may be connected to the bus 316 or other wires that connect to circuitry within the plug monitoring device 300, such as processor 302 and/or memory 304. In some embodiments the sensor 308 is a magnetic sensor that determines the status of the plug by sensing a magnet attached to the plug. For example, the sensor 308 may be a one-dimensional sensor that outputs a signal based on the distance, in a single direction, between the sensor 308 and the magnet attached to the plug. In another example, the sensor 308 may be a two-dimensional sensor that outputs a signal based on the distance, in a two directions, between the sensor 308 and the magnet attached to the plug. In another example, the sensor 308 may be a three-dimensional sensor that outputs a signal based on the distance, in a three directions, between the sensor 308 and the magnet attached to the plug. A non-limiting example of a three-dimensional sensor that may be used is a TLV493D-A1B6 3D Magnetic Sensor by Infineon™. In some embodiments, the sensor 308 is a magnetic reed switch that either opens or closes when the plug is tightly installed in an associated aperture due to the magnet on the plug separating two metallic reeds of the reed switch. In some embodiments the sensor is an optical sensor that emits light and detects light reflected from the plug to determine if a plug is tightly installed in the aperture.

The sensor 308 outputs a signal that is based on the position of the plug in the aperture. A first signal is output when the plug is tightly installed in the aperture and a second signal is output when the plug is not tightly installed in the aperture. In the case of a magnetic sensor that senses the distance between the sensor 308 and a magnet attached to the plug, the output signal may decrease monotonically as a function of the distance between the sensor 308 and the magnet. For example, the sensor 308 may output a "high" output signal when the plug is tightly installed and an "intermediate" output signal when the plug is loosely installed, and a "low" output signal when the plug is not installed at all. In the case of a reed switch, the output signal has only two states based on whether the reed switch is open or closed. For example, when the plug is tightly installed in the aperture, the switch may be closed resulting in a "high" output signal, and when the plug is not tightly installed in the aperture, the switch may be open, resulting in a "low" output signal.

The processor 302 is circuitry that may be configured to perform a number of operations. The processor 302 may be a general purpose processor that executes instructions stored in memory 304, a field programmable gate array (FPGA), an application specific integrated circuit (ASIC), or analog and/or digital circuitry configured to process the output signal of the sensor 308. In some embodiments, the processor 302 includes circuitry to implement a state machine that detects a change status of the status of the plug, causing the plug monitoring device 300 to operate in either a low power mode or a higher power mode. The processor 302 may control the frequency at which the sensor 308 makes measurements, the frequency at which the processor 302 determines the plug status based on the output signal, the frequency at which the transmitter 310 transmits status information, and/or the frequency at which the indicator 312 locally indicates the plug status. For example, in the low power mode one or more of the above frequencies may be less than a corresponding frequency in the higher power mode.

In some embodiments, the processor 302 includes circuitry configured to implement a comparator. The comparator receives as inputs the signal at the output of the sensor 308 and a calibration value from the calibration data 305 stored in the memory 304. The comparator includes an output selectively indicating differences between the signal at the output of the sensor 308 and the calibration value. In some embodiments, if the output signal of the sensor 308 meets a first criterion, then the status of the plug may be deemed tightly installed, and if the output signal of the sensor 308 meets a second criterion, then the status of the plug may be deemed not tightly installed. For example, the first criterion may be that the output signal of the sensor 308 corresponds to a value that is greater than the calibration value, and the second criterion may be that the output signal of the sensor 308 corresponds to a value that is less than or equal to the calibration value.

In some embodiments, the state machine circuitry of the processor 308 may detect a change status of the status of the plug based on the output of the comparator. For example, if the output of the comparator indicates that the status of the plug changes from tightly connected to not tightly connected, then the plug monitoring device 300 may transition from the low power mode to the higher power mode. When no change in plug status occurs for a predetermined period of time, the state machine may determine to operate the plug monitoring device 300 in the low power mode.

The battery 306 provides power to the other components of the plug monitoring device 300. In some embodiments, the battery may be a rechargeable battery. As discussed above, the power of the battery may be conserved by operating the plug monitoring device in a low power mode when the plug status has not changed for a predetermined amount of time.

The transmitter 310 may receive status information, determined by the processor 302 based on the output signal of the sensor 308, for the plug. The transmitter 310 is controlled by the processor 302 to transmit the status information at particular times. For example, the processor 302 may control the transmitter 310 to transmit the status information at a first frequency when in a low power mode and a second frequency that is higher than the first frequency when in a higher power mode. The transmitter 310 transmits the status information wirelessly using at least one antenna. The transmitter 310 may use any suitable wireless communication protocol. For example, the transmitter 310 may transmit the wireless signal as a Bluetooth beacon or a Zigbee beacon. The transmitter may utilize classic Bluetooth™, Bluetooth™ Low Energy, Zigbee, or some other low-power wireless communication protocol.

In some embodiments, the transmitter 310 transmits other information along with the status information. For example, the transmitter 310 may include timing information and identifier information in the wireless signal to allow a server to identify which of the multiple plug monitoring devices sent the signal and when the signal was sent. In some embodiments, the wireless signal comprising the status information may be encrypted.

The indicator 312 provides a local indication to a user based on the status of the plug. In some embodiments, the indicator 312 comprises a visual indicator such as a light. For example, a light of a first color may indicate the plug is not tightly installed. In some embodiments, a light of a second color may indicate the plug is tightly installed. In some embodiments, the light may not be constantly on but is, instead, turned on and off periodically to conserve battery power. In some embodiments, the frequency at which the light flashes may be based on the mode in which the plug monitoring device 300 is operating. For example, in the low power mode the light may flash at a first frequency and in the higher power mode the light may flash at a second frequency greater than the first frequency. In some embodiments, the indicator 312 is at least partially outside of the housing 320 to increase visibility of the indicator 312 to a user. In some embodiments, the indicator 310 comprises an audio indicator such as a speaker. For example, the speaker may emit an audible sound, such as a beep, when the plug is not tightly installed. In some embodiments, the speaker emits no sound when the plug is tightly installed. In some embodiments, the sound may not be constant, but may turn on periodically to conserve power. In some embodiments, the frequency at which the audio indicator emits a sound may be based on the mode in which the plug monitoring device 300 is operating. For example, in the low power mode the speaker may emit a sound at a first frequency and in the higher power mode the speaker may emit a sound at a second frequency greater than the first frequency.

The user interface 314 allows a user to provide input to the processor 302. In some embodiments, the user interface 314 may include a single button. The button may be used for calibrating the sensor. For example, pressing and holding the button for a threshold period of time may indicate to the processor 302 that the output signal of the sensor 308 should be stored as calibration data 305 in memory 304.

The housing 320 is used to contain one or more of the components of the plug monitoring device 300. Any magnet used in connection with the plug monitoring device 300 is separate and apart from the plug monitoring device 300 and located outside of the housing 320.

Figure 4:
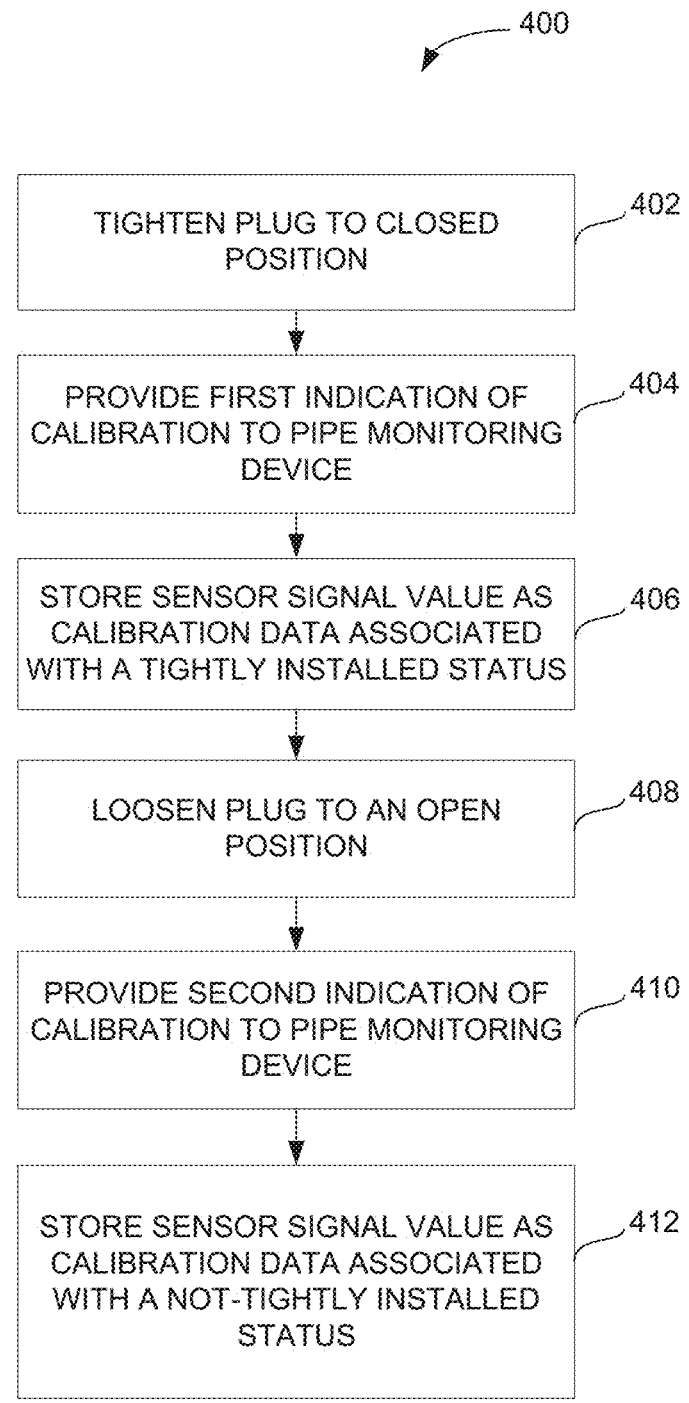
FIG. 4 is a flowchart of an example method for calibrating a plug monitoring device.

A flowchart of an example method 400 for calibrating a plug monitoring device is shown in FIG. 4. Providing the plug monitoring device 300 with a calibration procedure may increase the flexibility with which the plug monitoring device 300 may be used when retrofitting the plug monitoring device 300 to existing pipes and/or valves. A person installing the plug monitoring device 300, referred to here as a "user," may perform one or more of the acts.

At act 402, the user tightens the plug to the closed position. The closed position is where the plug is tightly installed within the associated aperture. The position of the plug that corresponds to the closed position is determined by the user based on how tightly the plug is tightened.

At act 404, the user provides a first indication of calibration to the pipe monitoring device 300, using for example, the user interface 314. For example, the user may press and hold a button of the user interface 314 or press the button a certain number of times within a specified time period (e.g., three times within two seconds) to provide the first indication. The processor 302 receives the first indication via the bus 316 or some other electrical connection within the plug monitoring device 300. Alternatively, the pipe monitoring device 300 can be calibrated using a mobile device that communicated with the sensor via the transmitter 310. For example, a mobile device may include an application that displays information about the pipe monitoring device 300 and includes an indicator on a graphical user interface of the mobile device. When the user selects the calibration indicator on the graphical user interface, the mobile device may send a wireless signal to the transmitter 310 (which may also include a wireless receiver) of the pipe monitoring device 300 to provide the first indication.

At act 406, the processor 302, in response to receiving the first indication, stores a current output signal value from the sensor 308 as calibration data 305 in the memory 304. The processor 302 may associate this output signal value with a status of the plug being tightly installed. In some embodiments, the current output signal value may not be the signal value at the exact time the first indication is received. For example, the processor 302 may wait to store the signal value until the signal value is stable. Waiting for a stable signal may prevent an inaccurate signal value being recorded. An inaccurate signal value may result from, for example, the user pressing a button on the plug monitoring device 300, which may cause the plug monitoring device 300 to move relative to the plug. The output signal value from the sensor 308 will vary due to the movement of the plug monitoring device 300. By causing this variation in the output signal value, the user interferes with the true reading of the sensor 308. Buy waiting for a stable signal value, inaccurate sensor 308 readings can be prevented.

At act 408, the user loosens the plug to an open position. The open position is where the plug is considered to be not tightly installed within the associated aperture. The position of the plug that corresponds to the open position is determined by the user based on how much the plug is loosened.

At act 410, the user provides a second indication of calibration to the pipe monitoring device 300, using for example, the user interface 314. For example, the user may press and hold a button of the user interface 314 or press the button a certain number of times within a specified time period (e.g., four times within two seconds) to provide the second indication. The processor 302 receives the second indication via the bus 316 or some other electrical connection within the plug monitoring device 300. Alternatively, the user may press an indicator on a graphical interface of a mobile device and the mobile device may send a wireless signal to the transmitter 310 (which may also include a receiver) of the plug monitoring device 300 to provide the second indication.

At act 412, the processor 302, in response to receiving the second indication, stores a current output signal value from the sensor 308 as calibration data 305 in the memory 304. The processor 302 may associate this output signal value with a status of the plug being not tightly installed. In some embodiments, the current output signal value may not be the signal value at the exact time the first indication is received. For example, the processor 302 may wait to store the signal value until the signal value is stable for the same reasons provided above in connection with the first indication.

While some embodiments use the above calibration method, other embodiments may not include the end user in the calibration process. Instead, the plug monitoring device 300 may be pre-calibrated before providing the device to the end use. For example, in embodiments where the plug monitoring device 300 is pre-installed on a pipe or valve and a magnet is pre-installed on the plug, end user calibration may not be necessary.

Figure 5:
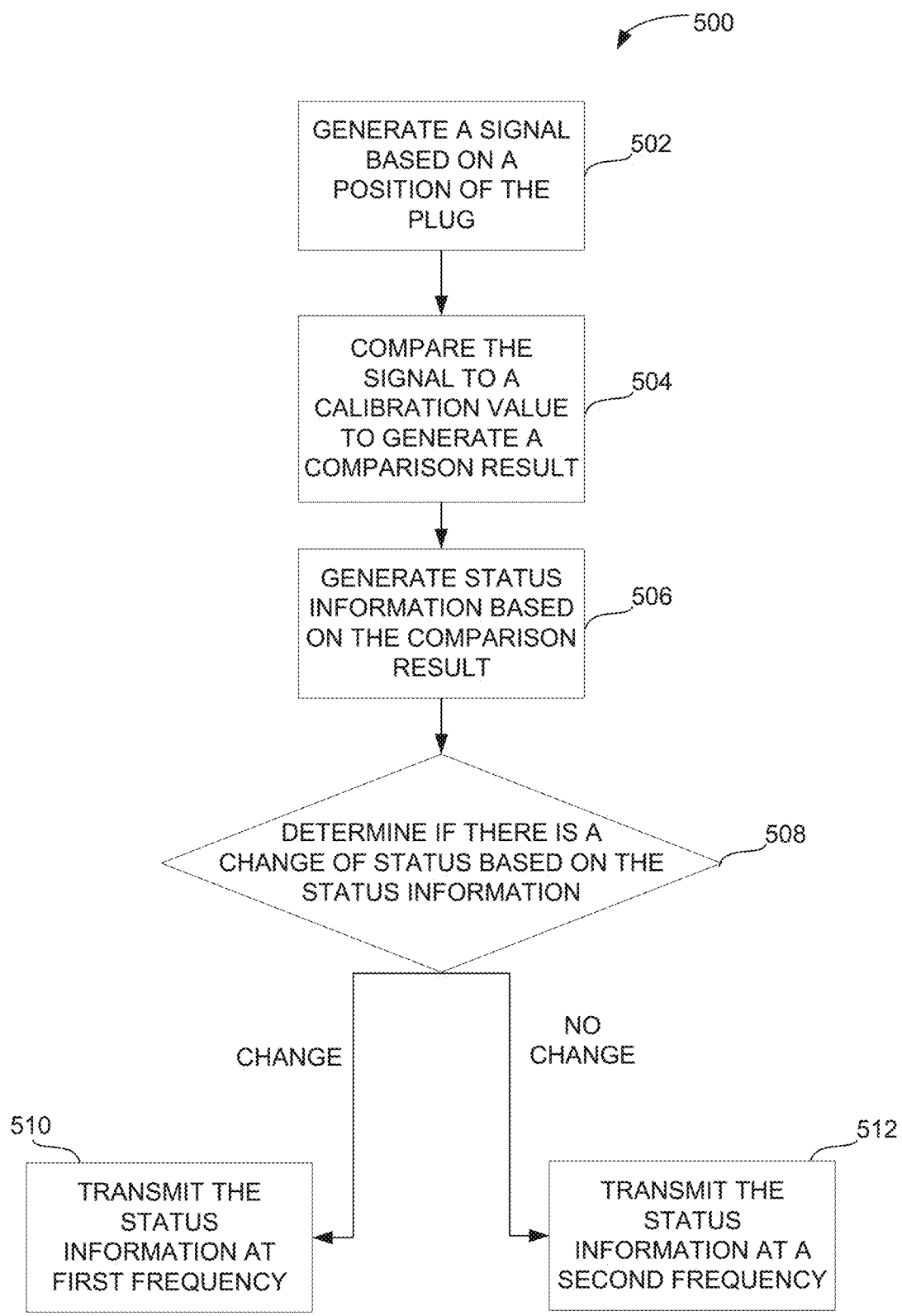
FIG. 5 is a flowchart of an example method for monitoring a plug.

A flowchart of an example method 500 for monitoring a plug is shown in FIG. 5. The method may be executed by one or more circuitry components of the plug monitoring device 300.

At act 502, a signal is generated based on a position of the plug being monitored. In some embodiments, the signal is the output signal of sensor 308. The output signal may be a first signal when the plug is tightly installed in the aperture and the output signal may be a second signal, different from the first signal, when the plug is not tightly installed in the aperture.

At act 504, the generated signal is compared to a calibration value to generate a comparison result. In some embodiments, the comparison is performed by comparator circuitry, which may be implemented by processor 302. The comparison result may be an indication of whether the generated signal has a value that is greater than or less than the calibration value. In some embodiments, the calibration value is the value stored as calibration data 305 in memory 304 during act 412 of method 400. The comparison result may be a single bit of information. For example, if the value of the generated signal is greater than the calibration value, the comparison result may be "0," and if the value of the generated signal is less than or equal to the calibration value, the comparison result may be "1."

At act 506, status information is generated based on the comparison result. In some embodiments, the status information is generated by the processor 302. In some embodiments, the status information may simply be the same single bit of information provided as the comparison result. In some embodiments, the comparison result of "0" is associated with a plug status of not being tightly installed and the comparison result of "1" is associated with a plug status of being tightly installed.

At act 508, the state machine of the processor 302 determines if there is a change in status based on the status information. For example, if the status information indicates that the plug has transitioned from being tightly closed to not tightly closed, or vice versa, the status is determined to be changed.

At act 510, in response to determining that the status of the plug changed, the status information, the transmitter 310 transmits the status information at a first frequency. At act 512, in response to determining that the status of the plug has not changed, the status information, the transmitter 310 transmits the status information at a second frequency. In some embodiments, the first frequency is greater than the second frequency. It should be understood that, as used in this context, "frequency" refers to a rate at which status information is transmitted, not a carrier frequency of a radio signal used to transmit the status information.

In addition to transmitting the status information at different frequencies based on a determination that the status of the plug has changed, the processor 302 may, in response to determining that the status of the plug has changed, control the frequency at which the sensor 308 makes measurements, the frequency at which the processor 302 determines the plug status based on the output signal, and/or the frequency at which the indicator 312 locally indicates the plug status. It should be understood that, as used herein, the frequency need not be constant and uniform. The frequency may be a mean or median frequency that is not strictly periodic with uniformly spaced occurrences. Additionally, the frequency may indicate how long to wait before attempting to take the respective action, but the processor 302 may wait longer based on other conditions.

Figure 6:
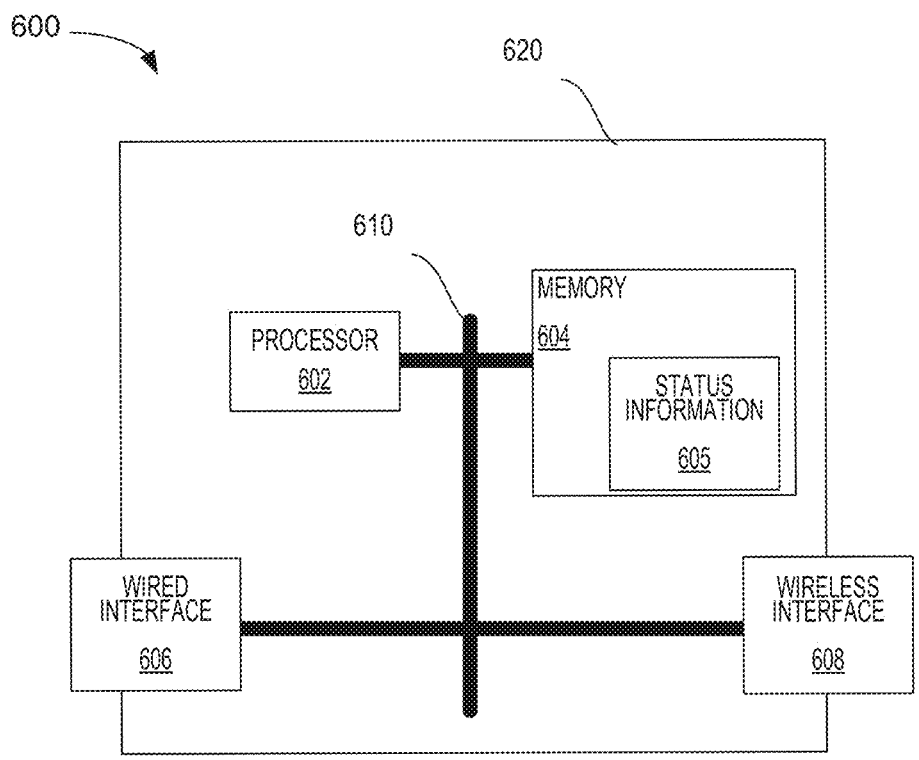
FIG. 6 is a schematic diagram of an example of a gateway device.

A schematic diagram of an example gateway device 600 is shown in FIG. 6. The gateway device 600 includes a processor 602, a memory 604, a wired interface 606 and a wireless interface 608. The various components communicate with one another using the bus 610 and/or other wiring (not shown). The wired interface 606 and the wireless interface 608 may be partially within a housing 620 and partially outside the housing 620. For example, the wired interface 606 may include a network cable receptacle outside the housing 620 and the wireless interface 608 may include an antenna (not shown) that is outside the housing 620.

The memory 604 is configured to store information and, in some embodiments, stores computer executable instructions that, when executed by the processor 602, perform the actions described herein. The memory 604 may be non-transitory storage device, such as RAM, ROM, EEPROM, flash memory or other memory technology. In some embodiments the memory 604 stores status information 605 received from multiple different plug monitoring devices. The status information 605 may include timing information and identifier information that associated each plug status with a particular plug monitoring device and time at which the status information was transmitted by said plug monitoring device.

The wireless interface 608 receives the status information from multiple different plug monitoring devices using any suitable wireless communication protocol. In some embodiments, the wireless interface 608 uses classic Bluetooth™, Bluetooth™ Low Energy, Zigbee, or some other low-power wireless communication protocol.

The wired interface 606 transmits the status information received from the multiple different plug monitoring devices to the server 112. This wired interfaces may use any one of numerous known networking protocols.

Figure 7:
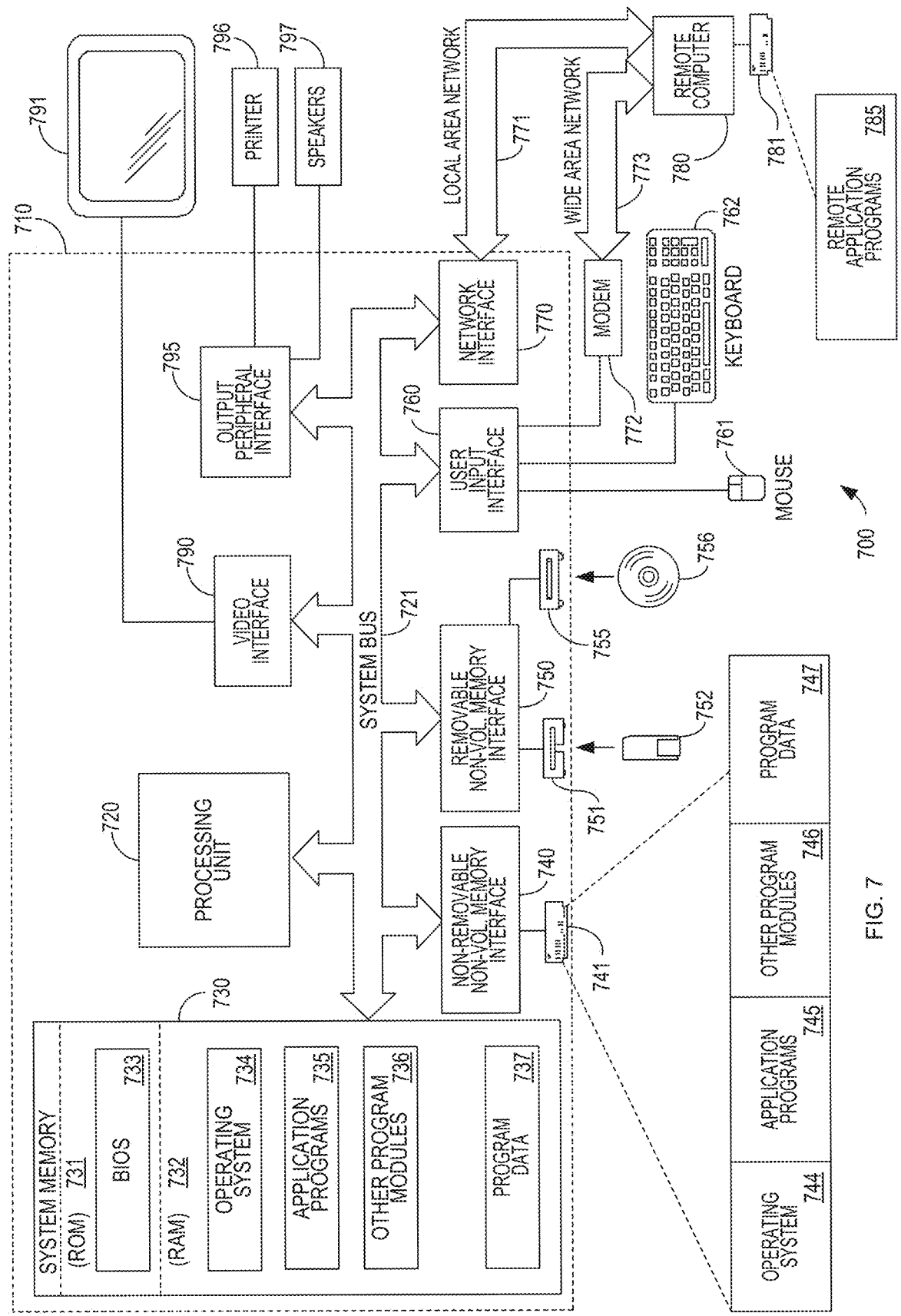
FIG. 7 is an example of a suitable computing system environment in which embodiments may be implemented.

An example of a suitable computing system environment 700 in which embodiments may be implemented is sown in FIG. 7. The computing system environment 700 may be used to implement the gateways 110, the server 112 and/or the user interface 120 of FIG. 1.

FIG. 7 illustrates an example of a suitable computing system environment 700 on which the invention may be implemented. The computing system environment 700 is only one example of a suitable computing environment and is not intended to suggest any limitation as to the scope of use or functionality of the invention. Neither should the computing environment 700 be interpreted as having any dependency or requirement relating to any one or combination of components illustrated in the exemplary operating environment 700. For example, in some embodiments, the server 112 is configured as a cloud service such that information stored on server 112 may be accessed remotely through one or more user interfaces 120 by users to view information stored in the event databases. Using one or more cloud-based servers may further improve efficiencies by using readily available and low cost networking and computation services, without the need for any special hardware deployment.

Embodiments are operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

FIG. 7 is illustrative of the various processing capabilities that may be used to implement different aspects of the techniques of the present application. Some components may not implement all of the processing capabilities illustrated in FIG. 7. However, devices such as the user interface 120 may implement the processing components illustrated in FIG. 10.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 7, an exemplary system for implementing the invention includes a general purpose computing device in the form of a computer 710. Components of computer 710 may include, but are not limited to, a processing unit 720, a system memory 730, and a system bus 721 that couples various system components including the system memory to the processing unit 720. The system bus 721 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface, such as interface 740, and magnetic disk drive 751 and optical disk drive 755 are typically connected to the system bus 721 by a removable memory interface, such as interface 750.

The drives and their associated computer storage media discussed above and illustrated in FIG. 7, provide storage of computer readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. A user may enter commands and information into the computer 710 through input devices such as a keyboard 762 and pointing device 761, commonly referred to as a mouse, trackball or touch pad. Other input devices (not shown) may include a microphone, joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 795.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on memory device 781. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

For example, the inventors have appreciated and recognized that a monitoring device of the type described in connection with plugs and apertures may be useful in other applications in which a state of a device is set based on a position of a first object with respect to a second object. A specific example of such an application is in monitoring whether a door or gate is in an open state or a closed state. Thus, in additional embodiments, a gate monitoring device configured to monitor a nonstationary portion of a gate to be received by a stationary portion of a gate may be provided. In some embodiments, the nonstationary portion of a gate may be a portion of the gate that swings up and down or side to side relative to the stationary portion. In some embodiments, the stationary portion of the gate may be a portion of the gate that does not swing or move to open and close the gate. For example, in the context of a security gate, the stationary portion of the gate may be a post to which the swinging, nonstationary portion of the gate latches when in a closed state. In the context of a railroad crossing gate, the stationary portion may be the pole to which the nonstationary portion is rotatably attached.

In some embodiments, the gate monitoring device includes a sensor includes an output that produces signals based on the open/closed status of the gate. For example, the sensor is configured to produce at the output a first signal when the nonstationary portion of the gate is closed relative to the stationary portion and a second signal at the output when the nonstationary portion of the gate is not closed relative to the stationary portion of the gate. In some embodiments, whether the gate is closed or open may be determined similar to the techniques described above in connection with the plug monitoring devices. For example, the sensor may be mounted to a latch of the gate such that the sensor may determine whether the gate is correctly latched. Additionally or alternatively, the sensor may be located on an edge of the nonstationary portion of the gate or the stationary portion of the gate to determine whether the gate is correctly closed. As described above, the sensor may be a magnetic sensor and a magnet may be placed on the portion of the gate that does not include the sensor. For example, a magnet may be placed on the nonstationary portion of the gate such that, when the gate is in a closed state, the magnet is in proximity to the sensor, which is attached to the stationary portion of the gate, and the sensor is able to determine that the gate is closed. Alternatively, a magnet may be placed on the stationary portion of the gate such that, when the gate is in a closed state, the magnet is in proximity to the sensor, which is attached to the nonstationary portion of the gate, and the sensor is able to determine that the gate is closed. In some embodiments, the sensor may be an optical sensor that operates in a manner similar to the optical sensors described above in plug monitoring applications. As in the plant applications described above in connection with plug monitoring devices and FIG. 1, the gate monitoring devices may send status information about the gate to a server, via one or more gateway devices, such that multiple gates may be monitored remotely. For example, the status of the gates in a building or complex with multiple gates may be monitored from a central location based on the status information transmitted to a server by each separate gate monitor. In some embodiments, a railroad operator may monitor the status of the many railroad gates of the railroad network from a central location based on the status information received from each individual gate monitoring device at a server, via at least one gateway device.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

As used herein in the specification and in the claims, the phrase "equal" or "the same" in reference to two values (e.g., distances, widths, etc.) means that two values are the same within manufacturing tolerances. Thus, two values being equal, or the same, may mean that the two values are different from one another by ±5%.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A plug monitoring device configured to monitor a plug to be received by an aperture of a pipe, the plug monitoring device comprising:
   a sensor having an output, wherein the sensor is configured to produce at the output a first signal when the plug is tightly installed in the aperture and a second signal at the output when the plug is not tightly installed in the aperture, wherein the sensor is further configured to detect a separation between the plug and the aperture along a direction of insertion of the plug into the aperture; and
   circuitry, comprising:
      a transmitter, coupled to the output of the sensor, wherein the circuitry is configured to transmit a signal comprising status information selectively based on a signal at the output of the sensor; and
      a computer memory;
   wherein detecting the separation between the plug and the aperture comprises comparing the signal at the output of the sensor to at least one threshold value stored in the computer memory.

2. The plug monitoring device of claim 1, wherein:
   the computer memory comprises a comparator
   the circuitry further comprises a calibration memory and a comparator;
   the comparator is configured to receive as inputs the signal at the output of the sensor and the at least one threshold value stored in the calibration memory;
   the comparator comprises an output selectively indicating differences between the signal at the output of the sensor and the at least one threshold value in the calibration memory; and
   the circuitry is configured to transmit the status information indicating a status of the plug installed in the aperture based on the output of the comparator.

3. The plug monitoring device of claim 2, wherein:
   the circuitry comprises a state machine configured to detect a change status of the status of the plug based on the output of the comparator and selectively transmit a signal based on a detected change of state.

4. The plug monitoring device of claim 2, wherein:
   the at least one threshold value stored in the calibration memory comprises:
      a threshold indicative of a signal at the output of the sensor when the plug is tightly installed in the aperture; and
      a second threshold indicative of the signal at the output of the sensor when the plug is not tightly installed in the aperture.

5. The plug monitoring device of claim 1, wherein the circuitry is battery powered.

6. The plug monitoring device of claim 1, wherein the sensor is a magnetic sensor.

7. The plug monitoring device of claim 6, wherein the sensor is a three-dimensional magnetic sensor.

8. The plug monitoring device of claim 6, wherein the sensor is a reed switch sensor.

9. A pipe monitoring kit comprising:
   the plug monitoring device of claim 6 further comprising a housing, wherein the sensor and the circuitry are disposed within the housing; and
   a magnet separate and distinct from the plug monitoring device.

10. The pipe monitoring kit of claim 9, further comprising the plug, wherein the plug comprises the magnet.

11. The plug monitoring device of claim 9, wherein the magnet comprises an annular magnet.

12. The plug monitoring device of claim 1, wherein the sensor is an optical sensor.

13. The plug monitoring device of claim 1, wherein the transmitter comprises a wireless transmitter.

14. The plug monitoring device of claim 13, wherein the wireless transmitter is configured to transmit the signal using a Bluetooth beacon or a Zigbee beacon.

15. The plug monitoring device of claim 13, wherein the wireless transmitter is configured to transmit the signal as an encrypted signal.

16. The plug monitoring device of claim 1, further comprising an audio indicator and/or visual indicator configured to convey the status information to a human operator of the plug monitoring device.

17. The plug monitoring device of claim 1, wherein the sensor is further configured to produce at the output a third signal that is a function of the separation between the plug and the aperture.

18. The plug monitoring device of claim 1, wherein the circuitry is configured to transmit the signal comprising the status information at a first frequency when the plug monitoring device is in a low power mode and a second frequency that is higher than the first frequency when the plug monitoring device is in a high power mode.

19. The plug monitoring device of claim 1, wherein:
   the plug monitoring device further comprises a battery;
   the circuitry is powered from the battery; and
   the circuitry is further configured to operate in a low power mode when the signal comprising status information has not changed within a threshold amount of time and to operate in a high power mode when the signal comprising status information has changed within the threshold amount of time.

20. A monitoring device configured to monitor a nonstationary object to be received in an aperture of a stationary object, the monitoring device comprising
   a sensor having an output, wherein the sensor is configured to produce at the output a first signal when the nonstationary object is disposed within the aperture of the stationary object and a second signal at the output when the nonstationary object is not disposed within the aperture of the stationary object, wherein the sensor is further configured to detect a separation between the nonstationary object and the aperture along a direction of insertion of the nonstationary object into the aperture; and circuitry, comprising:

a transmitter, coupled to the output of the sensor, wherein the circuitry is configured to transmit a signal comprising status information selectively based on a signal at the output of the sensor; and a computer memory, wherein detecting the separation between the nonstationary object and the aperture comprises comparing the signal at the output of the sensor to at least one threshold value stored in the computer memory.

21. The monitoring device of claim 20, wherein:

the computer memory comprises a calibration memory;

the circuitry further comprises a comparator;

the comparator is configured to receive as inputs the signal at the output of the sensor and the at least one threshold value stored in the calibration memory;

the comparator comprises an output selectively indicating differences between the signal at the output of the sensor and the at least one threshold value in the calibration memory; and the circuitry is configured to transmit the status information indicating a status of the nonstationary object disposed within the aperture of the stationary object based on the output of the comparator.

22. The monitoring device of claim 21, wherein:

the circuitry comprises a state machine configured to detect a change status of the status of the nonstationary object based on the output of the comparator and selectively transmit a signal based on a detected change of state.

23. The monitoring device of claim 20, wherein the sensor is a magnetic sensor.

24. The monitoring device of claim 23, wherein the sensor is a three-dimensional magnetic sensor.

25. The monitoring device of claim 20, wherein the sensor is an optical sensor.

26. The monitoring device of claim 20, wherein the nonstationary object comprises a nonstationary portion of a gate, and wherein the stationary object comprises a stationary portion of the gate.

* * * * *

UNITED STATES PATENT AND TRADEMARK OFFICE
CERTIFICATE OF CORRECTION

| | | |
|---|---|---|
| PATENT NO. | : 11,204,298 B2 | |
| APPLICATION NO. | : 16/360966 | |
| DATED | : December 21, 2021 | |
| INVENTOR(S) | : Shivakumar N. Chintadripet et al. | |

It is certified that error appears in the above-identified patent and that said Letters Patent is hereby corrected as shown below:

In the Claims

At Column 21, Claim 2, Line 50:
"the computer memory comprises a comparator"

Should read:
"the computer memory comprises a calibration memory;"

At Column 21, Claim 2, Lines 51-52:
"the circuitry further comprises a calibration memory and a comparator,"

Should read:
"the circuitry further comprises a comparator;"

Signed and Sealed this
Seventh Day of March, 2023

Katherine Kelly Vidal
*Director of the United States Patent and Trademark Office*